3,226,142
BALL JOINT ASSEMBLY
Edward J. Herbenar, Detroit, Mich., assignor to Thompson Ramo Wooldridge Inc., Cleveland, Ohio, a corporation of Ohio
Filed Jan. 10, 1963, Ser. No. 250,614
2 Claims. (Cl. 287—87)

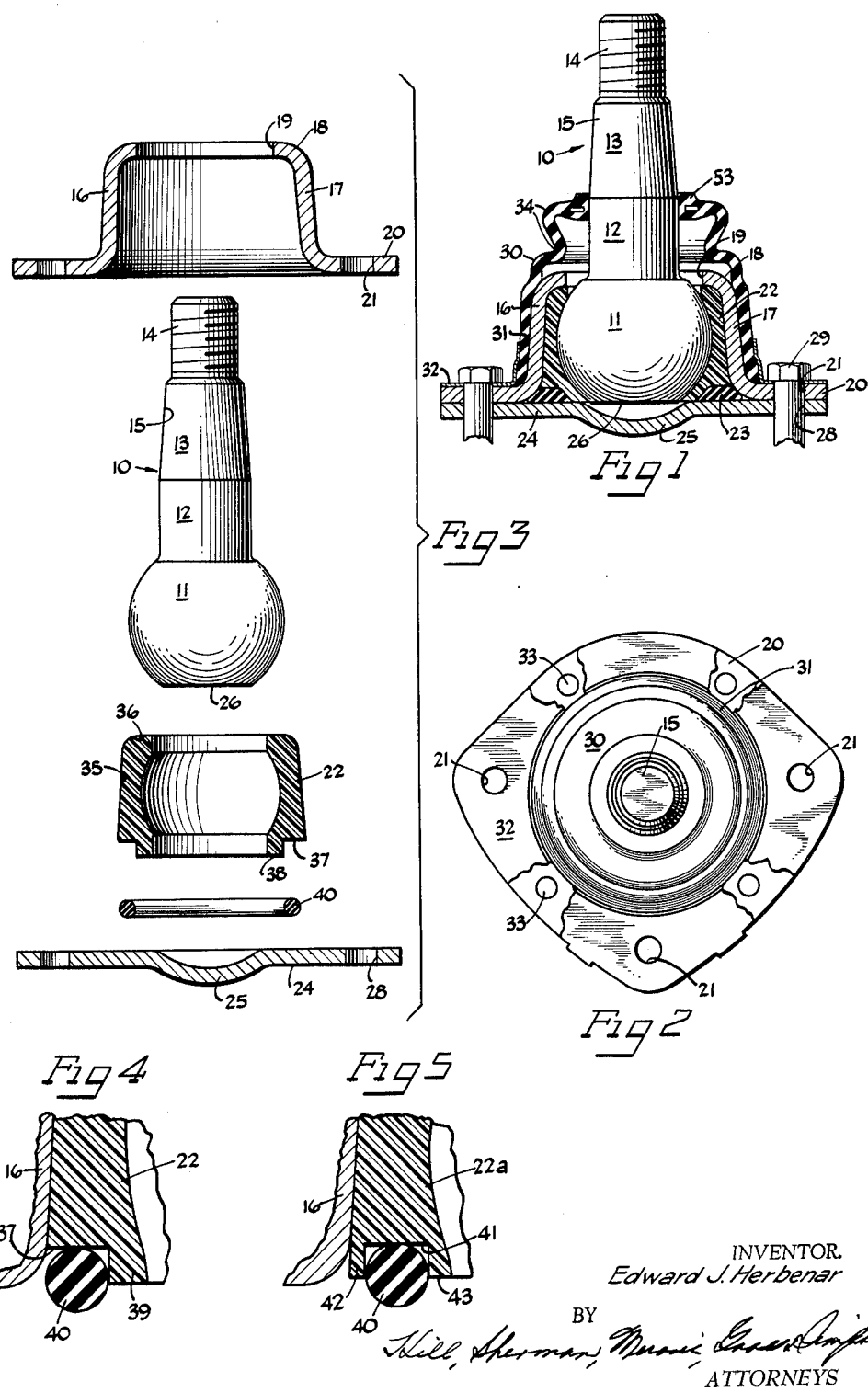

This invention relates to a ball joint assembly, and more particularly to a ball joint assembly of relatively inexpensive construction that is sealed against the ingress of moisture and that is of the self-lubricating type.

In recent years, efforts have been made by those in the automotive field to simplify the construction of ball joints such as used in vehicle steering linkage and suspension systems. In accordance with my present invention, a bearing member of a self-lubricating plastic and an O-ring are employed in a housing so arranged and constructed that upon completing the assembly of the joint the same is pre-loaded under the compressive forces exerted through the elastomeric material upon the plastic bearing member to thereby provide a joint that is tight at all times and requires no added lubricant. The elastomeric material, in addition to functioning in the pre-loading of the joint, effectively seals the housing upon assembly against ingress of air and moisture at the closure end of the housing. A flexible boot effects a similar seal between the ball stud and the housing and completes the sealing of the assembly.

It is therefore an object of the present invention to provide a ball joint assembly of relatively inexpensive construction that is self-lubricating and that provides a tight joint, automatically and without any adjustment being required, over substantially the complete lifetime of the vehicle with which the ball joint assembly may be used.

Other and further important objects of this invention will become apparent to those skilled in the art from a consideration of the following description and the attached drawing, wherein a preferred form of the invention is illustrated, and wherein:

FIGURE 1 is a vertical cross-sectional view, with parts in elevation, of a completed ball joint assembly constructed in accordance with the principles of the present invention;

FIGURE 2 is a top plan view, with parts broken away for the sake of clarity, of the ball joint assembly of FIGURE 1;

FIGURE 3 is an exploded view, partly in vertical section and partly in elevation, showing the components of the ball joint assembly and the manner of their assembly;

FIGURE 4 is a greatly enlarged, fragmentary, vertical cross-sectional view of a lower portion of the ball joint prior to final assembly; and FIGURE 5 is a similarly enlarged, fragmentary, vertical sectional view of a lower portion of a modified form of my invention.

As shown on the drawings:

The reference numeral 10 indicates generally a ball stud of usual form and construction, comprising a segmental spherical ball end 11, an adjacent cylindrical shank portion 12, an upwardly converging conical intermediate portion 13 and a reduced threaded end portion 14. The portions 12, 13 and 14 comprise what is usually termed the ball shank or stem, indicated generally by the reference numeral 15. Said ball stud 10 is conveniently integrally formed of metal.

The ball end 11 is mounted within a housing 16, preferably formed of a metal stamping of substantially uniform wall thickness. Said housing 16 is in the general form of an inverted cup, with an upwardly converging side wall 17 that is generally conical in form and that is inturned at its upper end to provide a retaining wall portion 18 which defines an opening 19 through which the shank 15 of the ball stud projects. In its normal position, the axis of the shank 15 lies along a continuation of the axis of the conical wall portion 17 of the housing, as illustrated in FIGURE 1. The lower end of said housing wall 17 is outwardly turned to provide a relatively wide flange 20 that is continuous about the periphery of the lower end of the housing and that is provided with attachment-receiving apertures 21, for a purpose that will later appear.

Still referring to the finished ball joint assembly of FIGURE 1, said assembly includes a bearing member 22 formed of a suitable self-lubricating, synthetic organic plastic, or polymer, and preferably of a unitary, or one-piece, construction. Examples of a suitable plastic include nylon, a high molecular polyamide, and polyethylene, both of which have effective self-lubricating properties and are relatively rigid yet deformable under compressive forces. Other plastics having a relatively low coefficient of friction may be used, as for instance polyurethane or a lubricant-impregnated rubber composition. As will be more fully explained in connection with the exploded view of FIGURE 3, said bearing member 22 is in conforming surface engagement with the inside of the housing wall, including the tapered side wall 17 and the inturned wall portion 18, and with the segmental spherical ball end 11. An annulus of elastomeric material, indicated by the reference numeral 23 is positioned between the lower end of said bearing member 22 and a closure member 24 for the lower end of said housing 16. Said closure member 24 may suitably be a metal stamping having a central downwardly dished portion 25 opposite the generally flat lower face 26 of said ball end 11 to provide clearance therebetween for angular movement of the ball stud, and said closure member 24 has an otherwise planar configuration conforming in its periphery with the periphery of the lower annular flange 20 of the housing and provided with openings 28 in register with the openings 21 in said flange for the reception of attachment means 29.

Said assembled ball joint also includes a flexible, impervious boot 30 having a lower portion 31 that snugly encloses the tapered side wall 17 of the housing and is permanently secured thereagainst by a thin sheet metal, flanged annulus 32 suitably secured, as by spot welds 33 (FIGURE 2) to the upper surface of the flange 20. The upper end of said boot 30 is provided with a thickened inwardly directed annular portion 53 that snugly and resiliently engages the cylindrical portion 12 and that thus forms a seal for the bearing contact area so enclosed by said boot. Folds 34 in the upper end of said boot 30 accommodate maximum angular movement of the ball stud shank 15 without disturbing the resilient engagement of said annular portion 53 with said shank portion 12.

In the preferred form of bearing member 22 illustrated in the exploded view of FIGURE 3, said bearing member 22 is initially provided with a generally conical outer surface 35 and a rounded upper edge 36 that enable the bearing member to be inserted into surface-conforming engagement with the inner surface of the conical side wall 17 and the inturned upper annular portion 18 of the housing 16. Also, said bearing member 22 in its initial normal state, is provided at its lower end with an outer annular peripheral recess 37 that provides a relatively thin walled cylindrical end portion 38. With the bearing member 22 in its initial, normal state, an O-ring 40, formed of suitable elastomeric material, such as rubber, is inserted in said annular recess 37 to encircle the cylindrical, reduced end portion 38 of the bearing member. In its initial state, the O-ring 40 is of a circular cross-section such that the volume of the ring is greater than the volume provided by the recess 37 and the ring 40 therefore projects therefrom below the lower face of the end portion 38 of the bearing member 22. Because of this greater volume of the O-ring 40, said ring automatically becomes effective to pre-load the joint of the ball joint assembly during the act of completing the assembly, as will now be explained.

As will be appreciated by reference to the exploded view of FIGURE 3, the one-piece bearing member 22, because of its yieldability, can be first slipped over the ball end 11 of the stud 10 and this sub-assembly then inserted into the housing 16, with the shank 15 of the ball stud extending through the opening 19. Thereafter, the O-ring 40 is inserted over the lower cylindrical end 38 of the bearing member 22, and the closure member 24 is brought up against the lower end of the housing 16 and forcibly held thereagainst with the peripheries thereof in matching relationship and the apertures 21 and 28 in register. While so held together, the closure member 24 and the flange 20 of the housing are spot welded together, as at 33 (FIGURE 2).

By this final act of assembly, the material of the O-ring 40 is placed under sufficient compressive force to cause the same to flow radially outwardly and inwardly into the form assumed by the annular mass indicated by the reference numeral 23 (FIGURE 1). At the same time, the compressive forces acting through the mass of elastomer cause the lower end 38 of the bearing member 22 to be deformed radially inwardly into close surface engagement with the segmental spherical ball end 11. The same compressive forces act upwardly through the elastomeric mass 23 to force and hold the bearing member 22 into surface engaging relationship to the inner surfaces of the tapered side wall portion 17 and the inturned annular wall portion 18, as also shown in FIGURE 1.

In the modified form of my invention illustrated in FIGURE 5, the lower end of a bearing member 22a is provided with an annular groove 41 that opens downwardly for the receipt of an O-ring 40 but is closed laterally by outer and inner annular end portions 42 and 43. Where this modified form of my invention is used, the O-ring 40, upon the final act of assembly, as above described, flows under the compressive forces exerted thereagainst to fill the groove 41 and deflect the outer and inner annular end portions 42 and 43, respectively, outwardly against the wall of the housing 16 and inwardly against the segmental spherical ball end 11, with a sufficient volume of the elastomeric material projecting below the bottom end faces of said bearing member 22a to exert a continuing upward pressure against said bearing member 22a to hold the same in tight bearing surface engagement with the ball end 11. Because of the self-lubricating properties of said plastic bearing member 22a, the joint remains tight during continued use over the normal life of the vehicle with which the ball joint assembly is used.

It will be understood that modifications and variations may be effected without departing from the scope of the novel concepts of the present invention.

I claim as my invention:
1. A ball joint assembly comprising:
a cup-shaped housing having a stud-receiving aperture defined by a radially inturned annular wall portion at one end of said housing and having a radially extending annular housing flange at the other open end of said housing,
a headed ball stud having a substantially spherical head end within said housing with the shank thereof freely projecting through said aperture,
a substantially cylindrical self-lubricating synthetic plastic bearing member located between said ball and housing in conforming lateral surface contact with said head end and with said housing inner wall and in endwise contact with said inturned annular wall portion to fill the lateral space between said head end and said housing,
the end of said bearing member away from said annular wall contacting portion having an annular recess therein defining a flexible substantially axially extending annular flange radially inwardly of the outer periphery of said bearing member,
an O-ring of elastomeric material extending into said annular recess and being of sufficient cross-section to project therefrom in the free state, and
a closure member secured to the open end of said housing to said annular housing flange and closing said open end of said housing,
said closure member engaging and exerting a compressive force upon said O-ring to deform the same in said annular recess and to radially constrict the annular flange of said bearing member into conforming surface contact with said substantially spherical head, the end of said constricted bearing annular flange resting adjacent a surface of the closure member to be in a position to derive support therefrom and thereby urging said head end and bearing member toward said radially inturned annular wall portion.

2. A ball joint assembly comprising:
a cup-shaped housing having a stud-receiving aperture defined by a radially inturned annular wall portion at one end of said housing and having a radially extending annular housing flange at the other open end of said housing,
a headed ball stud having a substantially spherical head end within said housing with the shank thereof freely projecting through said aperture,
a substantially cylindrical self-lubricating synthetic plastic bearing member located between said ball and housing in conforming lateral surface contact with said head end and with said housing inner wall and in endwise contact with said inturned annular wall portion to fill the lateral space between said head end and said housing,
the end of said bearing member away from said annular wall contacting portion having an annular recess therein defining a flexible substantially axially extending annular flange radially inwardly of the outer periphery of said bearing member,
an O-ring of elastomeric material extending into said annular recess and being of sufficient cross-section to project therefrom in the free state, and
a closure member secured to the open end of said housing to said annular housing flange and closing said open end of said housing,
said closure member engaging and exerting a compressive force upon said O-ring to deform the same in said annular recess and to radially constrict the annular flange of said bearing member into conforming surface contact with said substantially spherical head, the end of said constricted bearing annular flange resting adjacent a surface of the closure member to be in a position to derive support therefrom and thereby urging said head end and bearing member toward said radially inturned annular wall portion, said bearing member being comprised of a synthetic organic plastic and being of a unitary construction.

References Cited by the Examiner
UNITED STATES PATENTS

| | | |
|---|---|---|
| 1,940,466 | 12/1933 | Sneed. |
| 2,708,590 | 5/1955 | Latzen. |
| 2,726,105 | 12/1955 | Koenig _____ 287—88 |
| 2,885,248 | 5/1959 | White _____ 287—87 |
| 2,910,260 | 10/1959 | Tanner _____ 287—87 |
| 3,004,786 | 10/1961 | Herbenar. |
| 3,025,090 | 3/1962 | Langen _____ 287—87 |
| 3,028,183 | 4/1962 | Phillips _____ 287—87 |
| 3,058,765 | 10/1962 | Thomas. |
| 3,063,744 | 11/1962 | Flumerfelt. |
| 3,097,060 | 7/1963 | Sullivan _____ 308—26 X |

FOREIGN PATENTS

| | | |
|---|---|---|
| 797,545 | 7/1958 | Great Britain. |
| 813,044 | 5/1959 | Great Britain. |

CARL W. TOMLIN, *Primary Examiner.*